United States Patent [19]

Margulis et al.

[11] 3,747,918

[45] July 24, 1973

[54] DOCUMENT FEEDER CONTROL CIRCUIT

[75] Inventors: Harry Margulis, Hofmann Estates; Roy D. Korff, Elk Grove Village, both of Ill.

[73] Assignee: Addressograph-Multigraph Corporation, Mount Prospect, Ill.

[22] Filed: Nov. 22, 1971

[21] Appl. No.: 201,071

[52] U.S. Cl............................ 271/4, 271/47, 271/50
[51] Int. Cl............................ B65h 5/02, B65h 7/20
[58] Field of Search ...................... 271/4, 10, 47, 57, 271/53, 60, 58, 50

[56] References Cited
UNITED STATES PATENTS

| | | | |
|---|---|---|---|
| 3,567,214 | 3/1971 | Crandell et al. ...................... | 271/10 |
| 3,408,140 | 10/1968 | Hemphill ........................... | 271/50 X |
| 3,153,962 | 10/1964 | Mercer et al. ...................... | 271/57 X |
| 3,626,956 | 12/1971 | Sauder................................ | 271/57 |

Primary Examiner—Evon C. Blunk
Assistant Examiner—Bruce H. Stoner, Jr.
Attorney—Richard D. Mason et al.

[57] ABSTRACT

A document feeder transfers original documents placed in a stack one at a time in succession into a copying position on an exposure platen of a copy machine. The control circuit for the feeder includes means for initiating the feeding of an original document from a stack of original documents in the tray of the document feeder into and along a transport path. The control circuit additionally enables the document feeder to expel an original document from the exposure platen of a copy machine after a desired number of copies have been made. The control circuit further includes means to prevent the feeding of further original documents into and along the transport path until the desired number of copies of a previously fed original document are completed. The control circuit further controls the initiation of the copying process of the copy machine. Additionally, means are provided to detect the jamming of an original document during its expulsion from the exposure platen of the copy machine.

3 Claims, 9 Drawing Figures

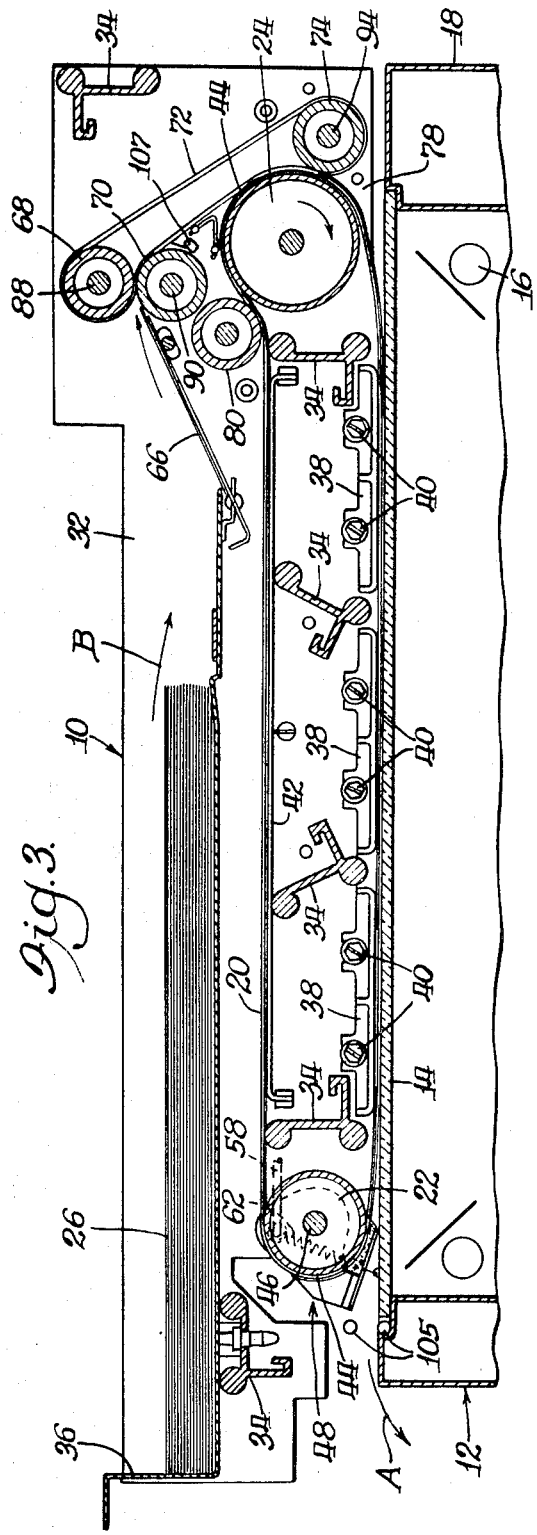
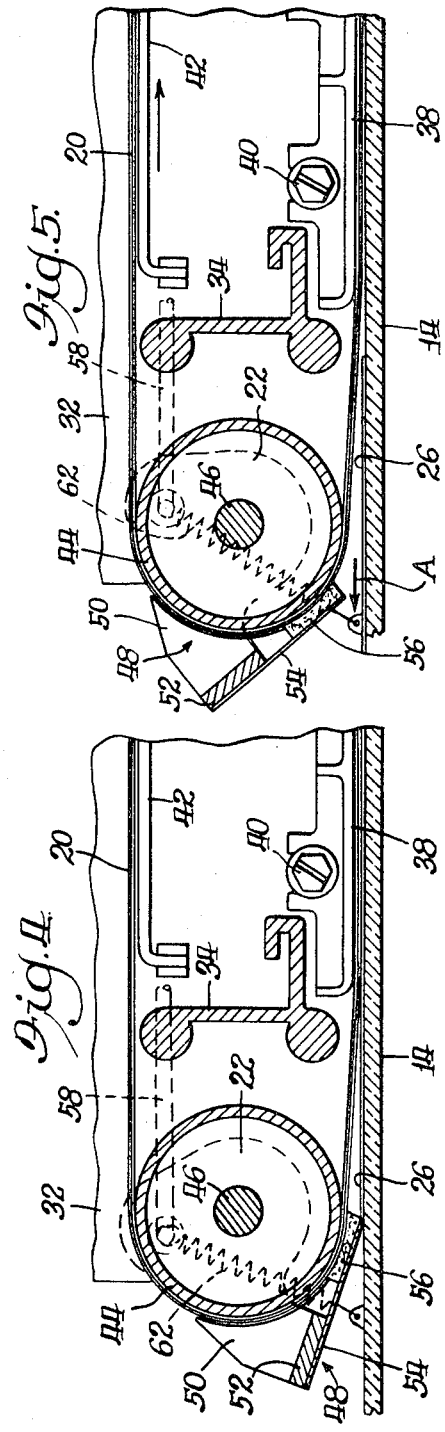

PATENTED JUL 24 1973

DOCUMENT FEEDER CONTROL CIRCUIT

BACKGROUND OF THE INVENTION

This invention relates generally to a control circuit for a document feeder used to transfer documents from a stack contained in a tray one at a time in succession into a copying position on an exposure platen of a copy machine. The invention control circuit integrates the operation of the document feeder with a copying machine so that any desired number of copies of an original document may be automatically produced. The circuit controls the removal of an original document from the exposure platen after the desired number of copies have been made and further controls the transfer of a next original document into position on the exposure platen for copying.

SUMMARY OF THE INVENTION

An object of the present invention is to provide a new and improved control circuit for a document feeder.

Another object of the present invention is to provide a new and improved circuit of the character described which is operable to control the feeding of original documents one-by-one into a copying position on an exposure platen of a copy machine so that any selected number of copies may be automatically reproduced.

A further object of the present invention is to provide a new and improved control circuit of the character described that is operable to initiate the copying process of a copy machine and is further operable to monitor the transfer of an original document out of the transport path of a document feeder.

Briefly, the present invention is especially adapted to control the transfer of original documents, from a document feeder such as shown in the copending U.S. Pat. application Ser. No. 201,043, filed contemporaneously, which application is assigned to the same assignee as the present application, one at a time in succession into a copying position on an exposure platen of a copy machine, such as shown in the copending U.S. Pat. application Ser. No. 889,594, filed Dec. 31, 1969, now Pat. No. 3,663,102 which application is assigned to the same assignee as the present application. The control circuit provides means for initiating the feeding of an original document into and along the document transport path of a document feeder. The control circuit further includes means to cause the correct positioning of an original document of the exposure platen of a copy machine and means for initiating the copy process of a copy machine. The control circuit of the present invention further includes means causing an original document to be expelled from the transport path and for monitoring the expulsion thereof to detect any possible jam of tht original document. Finally, the control circuit includes means for discontinuing the operation of a document feeder and of a copy machine when the supply of original documents is exhausted.

DESCRIPTION OF THE DRAWINGS

For a better understanding of the invention and its organization and construction, reference should be had to the following detailed description taken in conjunction with the accompanying drawings, in which:

FIG. 3 is a longitudinal vertical sectional view, taken substantially along line 3—3 of FIG. 1;

FIG. 4 is an enlarged fragmentary sectional view similar to FIG. 3 showing only one end portion of an endless belt with a document stop gate in its stopping or closed position;

FIG. 5 is a sectional view similar to FIG. 4 but showing the document stop gate in an open position;

DETAILED DESCRIPTION

General

Figure 1:
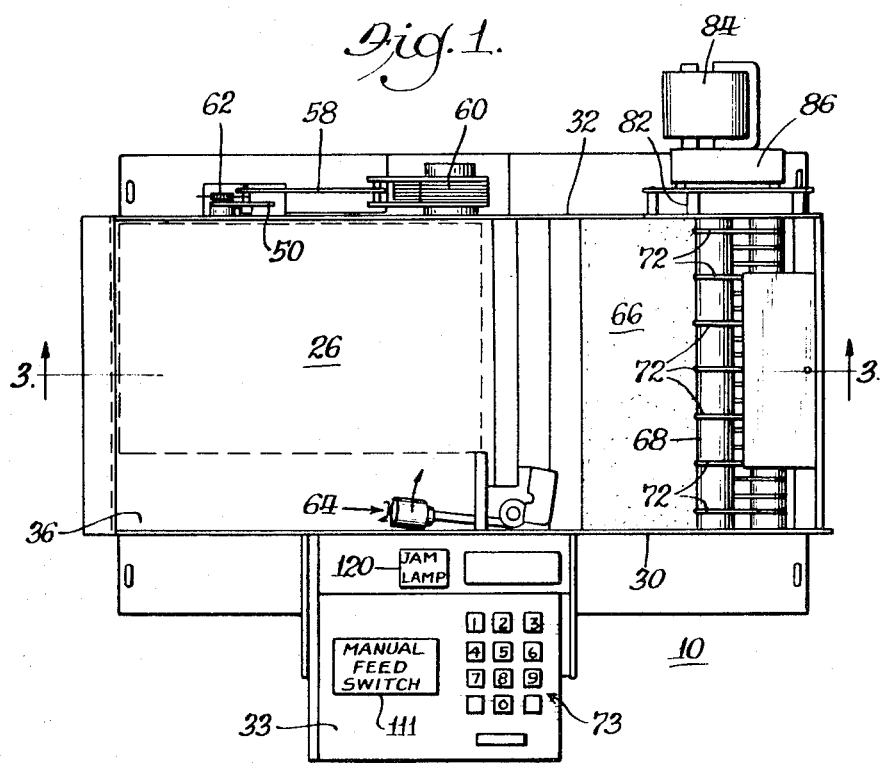
FIG. 1 is a top plan view of a preferred embodiment of a document feeder constructed in accordance with the features of the present invention.
Figure 2:
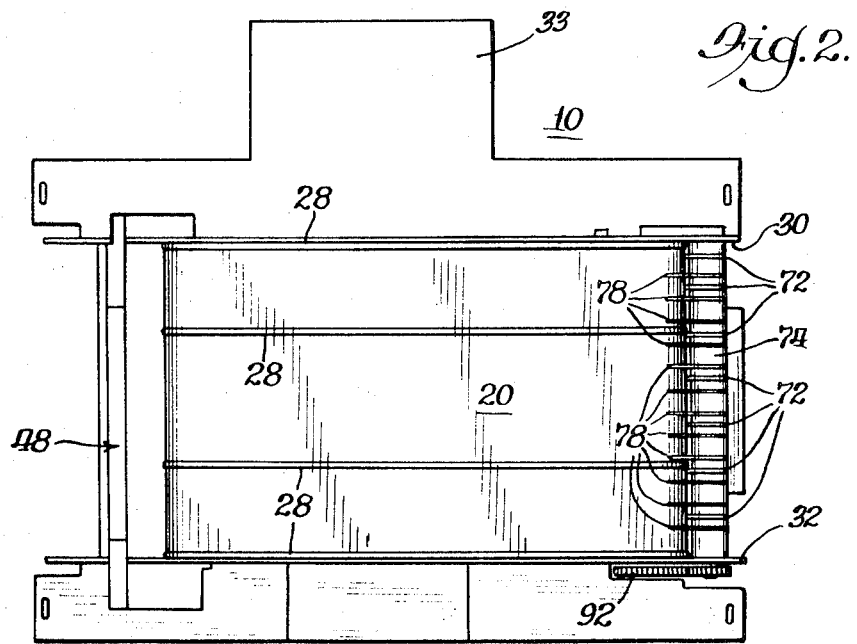
FIG. 2 is a bottom view of the document feeder of FIG. 1.

Referring now more in detail to the drawings, especially FIGS. 1–5, therein is illustrated a document feeder referred to generally in FIGS. 1 and 2 by a reference numeral 10. The document feeder 10 is adapted to be mounted on top of a copy machine 12 (FIG. 3) which has an exposure platen 14 on which documents to be copied are positioned. The aforementioned copending U.S. Pat. application Ser. No. 889,594 illustrates a copy machine which is readily integrated with the document feeder.

As more fully described in this patent application, the copy machine 12 includes xenon light sources 16 (FIG. 3) beneath a glass platen 14 which is supported in a rectangular opening and is flush with an upper end wall of a rectangular support structure 18 of the copy machine. The document feeder 10 is adapted to be positioned directly on top of the exposure platen 14, as shown, and operates in coordinated asoociation with the copy machine 12.

Endless Belt

The document feeder 10 includes an endless feed belt 20 (FIGS. 6, 7, and 8) formed of a thin, flexible, sheet material, such as Mylar. This material is tough, strong, and opaque so that light will be reflected therefrom as the endless run of the belt slips easily over the upper surface of the platen 14 on the copy machine 12. The belt 20 (FIG. 7) is formed into an endless belt loop and is fabricated by cutting on an angular bevel at opposite ends (FIG. 6) and beveling the edge thereof as indicated by the roughened edges 21 of the belt material. These portions are feathered to a sharp pointed edge so that they may be joined together by cement or other suitable chemical fastening agents to form a uniform thickness endless belt 20. The joint between the edges is angular with respect to the direction of a plurality of longitudinal parallel ridges 28.

The belt 20 is trained over a pair of rollers 22 and 24 (FIG. 3) at opposite ends of the upper and lower belt runs. The lower belt run is adapted to move over and in parallel with the upper surface of the exposure platen 14 in associated copy machine 12. The roller 24 is preferably composed of a high strength silicone rubber, such as GE 154 silicone rubber, and has a high coefficient of friction with respect to the Mylar surface of the belt 20 to rotate the belt 20 without slippage.

Figure 6:
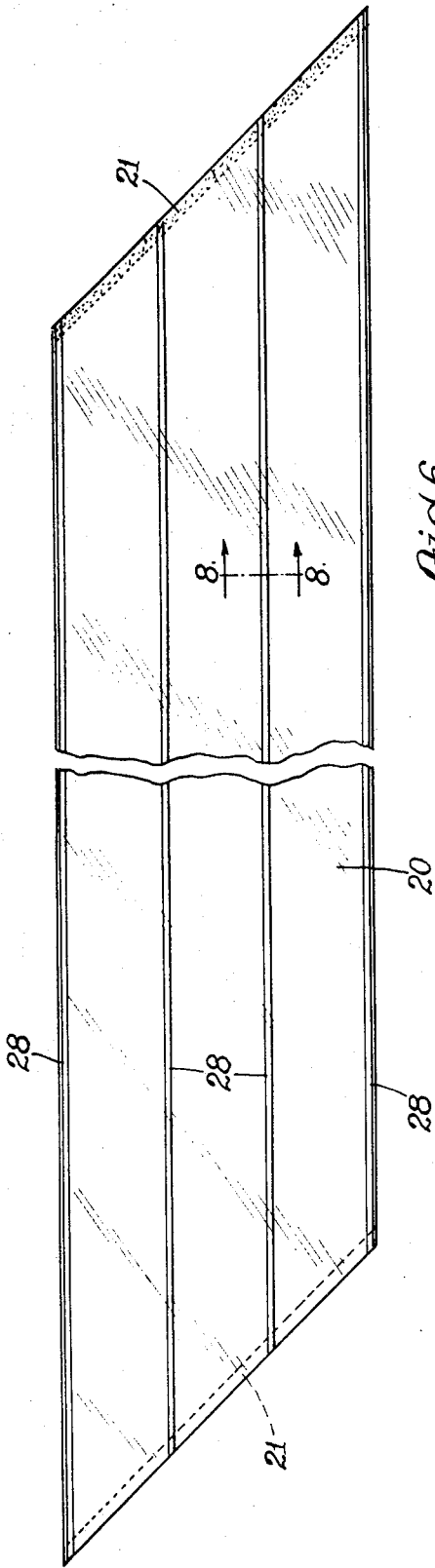
FIG. 6 is a perspective view of a preferred embodiment of an endless belt constructed in accordance with the features of the present invention.
Figure 7:
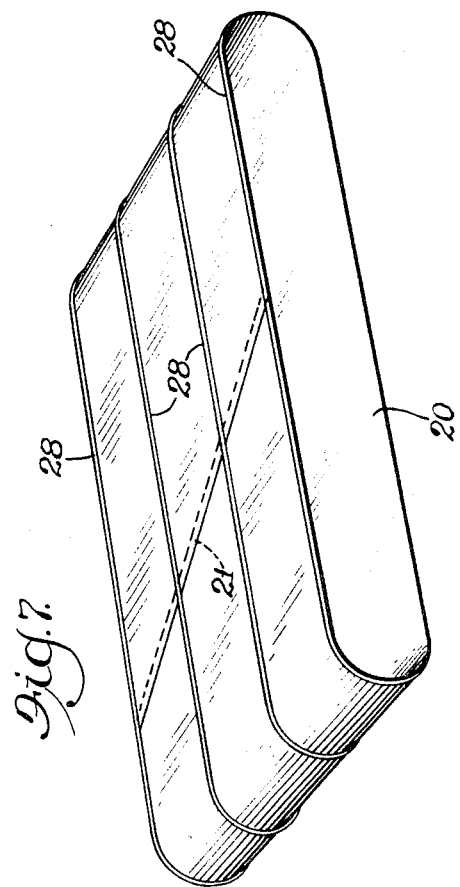
FIG. 7 is a perspective view of the endless belt of FIG. 6 illustrated as formed in an endless belt loop.
Figure 8:
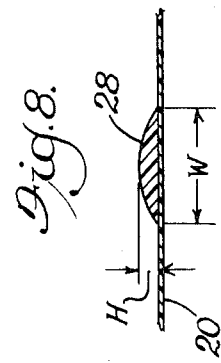
FIG. 8 is a fragmentary cross-sectional view of a portion of the endless belt of FIGS. 6 and 7 illustrating a parallel, longitudinal ridge on an outer surface of the endless belt.

In order to frictionally engage and move a document 26 (FIGS. 4 and 5) into proper position on the platen 14 for copying by the copy machine 12, the endless belt 20 is provided with a plurality of longitudinally extending parallel ridges 28 (FIGS. 6, 7, and 8). The ridges 28 are preferably composed of silicone rubber, are formed only on the outer surface of the endless belt, and are of a transverse cross-section, substantially comprising a chordal segment of a cylinder having a base width W (FIG. 8) which is considerably greater than a maximum height H of the outer surface of the ridge 28 away from the outer surface of the adjacent belt 20. Since the ridges 28 are composed of silicone rubber, there is a higher coefficient of friction between the ridges 28 and the glass platen 14 than between the Mylar surface of the belt 20 and the glass platen 14. Thus, while the belt 20 easily slides across the platen 14, the ridges 28 must be pulled across the platen 14 by the roller 24. The outer surfaces of the ridges 28 provide a frictional engagement with the back side of the document 26 for movement of the document along the face of the platen 14 into a copying position (FIG. 4). The frictional engagement is such that when the document 26 is in a copying position on the exposure platen 14 of the copy machine 12 and is engaged by a stop surface of a movable gate assembly 48 (FIG. 4), the outer surfaces of the ridges 28 will disengage from and slide over the base side of the document 26.

After the preselected number of copies have been made, the stop surface of the gate assembly 48 is removed (FIG. 5), and the endless belt 20 is moved in a clockwise direction. The frictional engagement between the belt ridges 28 and the back side of the original document 26 with the stop surface of the gate assembly 48 removed (FIG. 5) is sufficient to cause the document 26 to move to the left, as shown by the arrow A, for discharge from the document feeder 10 (FIG. 3).

Document Feeder

The document feeder 10 (FIGS. 1 and 2) includes front and back side members 30 and 32, which are structurally interconnected by a plurality of transverse cross-members 34 (FIGS. 3, 4, and 5). The endless belt 20 (FIG. 3) is trained around the rolls 22 and 24 to run between and in a direction parallel of the sidewalls 30 and 32 in a clockwise direction (FIG. 3), wherein an upper run of the belt 20 goes from left to right and a lower run of the belt 20 moves from right to left along the upper surface of the exposure platen 14 of the copy apparatus 12.

Projecting forwardly of the front sidewall 30, the document feeder 10 includes a control head 33 (FIG. 1) which integrates the operation of the document feeder 10 with the copy machine 12. The control head 33 includes means, generally indicated as 73 (FIG. 1), for programming a desired number of copies of an original document into an exposure counter 113 (FIG. 9), a manual feed switch 111 (FIG. 1), and a jam lamp 120 for indicating the presence of a jam of an original document at the exit of the document feeder 10.

An operator may place a stack of documents 26 (FIG. 1) to be copied in a receiving tray 36, and the documents will be picked up one at a time and fed in succession by means of the endless belt 20 into a copying position on the exposure platen 14 of the copy machine 12 (FIG. 4). The number of copies of each document to be produced is programmed into the control head 33 by the operator. The operation then becomes automatic so that the operator may leave the facility and later return to find that the selected number of copies of all of the original documents 26 placed in the tray 36 have been reproduced by the copy apparatus 12.

The document feeder 10 further includes a miniature switch sensor 107 (FIG. 3) referred to hereinafter as a feeder reset switch 107, located just past a pair of rollers 68 and 70 along the transport path and capable of being deflected by the passage thereby of an original document 26. The document feeder 10 also includes a photoelectric sensor 105 (FIG. 3) located at the exit of the document feeder 10 for detecting the passage of an original document 26 thereby.

The lower run of the endless belt 20 moves the original documents 26 into copying position from right to left in frictional engagement with the back side thereof. In order to insure that adequate frictional engagement is maintained between the belt and the document, a plurality of backing members 38 (FIGS. 3–5) extend traversely between front and back sidewalls 30 and 32. The backing members 38 include lower channel portions having undersurfaces adapted to bear against the inside surface of the endless belt 20. The opposite ends of the backing members are provided with vertical end flanges having slots therein for receiving mounting bolts 40 comprising sheet metal screws engaged in the front and rear plates 30 and 32. Thus, the backing members 38 may be adjustably positioned in a vertical direction so that the undersurface thereof exerts a desired amount of downward pressure on the inside surface of the endless belt toward the exposure platen 14 of the copy apparatus. To prevent sagging, the upper run of the endless belt 20 is supported by an upper backing plate 42 of generally channel-shaped configuration which extends between front and back sides 30 and 32.

The belt rollers 22 and 24 are provided with outer sleeves 44 of frictional material, such as rubber, to provide good driving engagement between these rollers and the back side or inside surface of the endless belt 20. The roller 22 is supported on an idler axle 46 which is supported in suitable bearing means carried on the front and back side plates 30 and 32.

The axle 46 also provides a support for a gate assembly 48 which is pivotally movable about the axle 46 between a stop or blocking position (FIG. 4) and an open position (FIG. 5) wherein the original document, after being copied, may be discharged as shown by the arrow A (FIGS. 3 and 5). The gate assembly 48 includes a pair of end flanges 50 disposed at opposite ends of the roller 22 and journaled or pivotally mounted on the axle 46. The end flanges are connected by a cross member 52 of relatively thick material.

A stop member 54 formed of relatively thin, flexible material, such as sheet material or the like, is secured to the underside of the cross member 52 and is supported in cantilever fashion thereon with a free end portion projecting outwardly of the cross member between the roller 22 and the platen 14 (FIGS. 4 and 5). The stop member is of a consistency similar to a thin steel rule and is slightly flexible in nature yet relatively strong. The outer edge of the free end portion of the stop member forms a stopping surface adapted to engage the upper surface of exposure platen 14 (FIG. 4). A strip of resilient material 56 is affixed to the stop member to provide a continuation of a stopping surface to engage the end of the original document 26 (FIG. 4), should its end tend to curl upwardly away from the upper surface of an exposure plate. The resilient strip 56 serves a dual function in providing an extension of the stop surface of the outer end of the member 54 and in contacting the belt 20 to provide cleaning action therefor by removing articles or the like which may cling to the outer surface thereof.

The gate assembly 48 is pivotally movable about the axle 46 between two spaced positions. The stop or blocking position is shown in FIG. 4 wherein the end of the original document 26 is engaged and held in a desired position for copying on the exposure platen 14. When the copying has been completed, the gate assembly 48 is pivoted in a clockwise direction from the position of FIG. 4 to the position of FIG. 5 by means of a gate control rod 58 which is connected to the armature of a gate control solenoid 60 (FIG. 1). The gate assembly 48 is normally maintained ained in the stop position (FIG. 4) by means of a coil spring 62 (FIG. 1) which tends to withdraw the armature from the solenoid coil of the gate control solenoid 60. When the solenoid is energized, the armature is pulled in and the control rod 58 exerts a clockwise torque on the gate assembly 48 against the bias of the spring 62 to move the assembly to the open position (FIG. 5). This opens the gate and permits the discharge of the original 26 when the belt 20 is moved.

The top one of the original documents 26 in the stack contained in the tray 36 is picked off by a feeder assembly conventional per se and generally indicatd as 64 (FIG. 1), and is advanced from left to right, as shown in FIG. 3 by the arrow B, toward an upwardly sloping ramp member 66. The leading edge portion of the document advanced by the feeder assembly 64 moves up the sloped ramp 66 and is engaged between a first pair of rollers 68 and 70, each having a sleeve of rubber or other frictional material on the outer surface thereof to provide good frictional contact with the document.

As the document moves between the rollers 68 and 70, it is turned downwardly toward the main roller 24 by a plurality of laterally spaced apart, endless belts 72 which are trained around grooves provided in the upper roller 68 on the one hand and in grooves formed on a lower roller 74 (FIG. 3). The belts 72 are circular in cross-section and are preferably formed of flexible plastic material having suitable frictional qualities for engaging the surface of the document 26. As each document 26 passes between the upper pair of rollers 68 and 70, the plurality of spaced apart belts 72 guide the leading edge of the document 26 downwardly past a V-shaped deflector 76 to engage the endless belt 20 as it is trained around the roller 24. As the leading edge of the document 26 passes around the roller 24, it is guided to the left and under the roller 24 by the plurality of belts 72 and a plurality of transversely spaced guide fingers 78 having curved upper surfaces thereon substantially conforming to the path of the underside of the main endless belt 20 (FIG. 3). As shown in FIG. 2, the fingers 78 are spaced between the belt loops 72 and direct the leading edge of the documents down towards the exposure platen 14 beneath the endless belt 20.

A portion of the roller 24 is spaced upwardly above the upper run of the endless belt 20. In order to provide the desired tension on this belt, a tension roll 80 is provided adjacent the right-hand end of the upper run support member 42 and upwardly and to the left of the roller 24. The rollers 68, 70, 74, and 80 are provided with outer belt engaging sleeve material which is resilient and has good frictional characteristics for contact with the belt 20 or the document 26.

Each of the rollers is supported on a shaft extending between the front and rear side plates 30 and 32. The main belt roller 24 is supported on an axle or a drive shaft 82 for controlled rotation in a clockwise direction (FIG. 3). Motive power rotating the main roller drive shaft 82 is supplied by an electric motor 84 and gear reducing unit 86 (FIG. 1). Three axles 88, 90, and 94 supporting the rollers 68, 70, and 74, respectively, are driven in synchronism with the roller 24 to provide proper direction and speed of drive for the belts 72 which move in counterclockwise direction contrasted with the clockwise movement of the main endless belt 20. The drive shafts 82, 88, 90, and 94 are drivingly connected by a link chain 92 or toothed belt to insure proper speed and direction of rotation of the various shafts.

In operating the document feeder 10, the operator places a plurality of original documents 26 in the feed tray 36 and then through the control head 33 manually enters information relating to the desired number of copies of each of the documents 26. The operator then initiates a start cycle by depressing a manual feed switch 111 causing the feeder assembly 64 to feed the top document in the stack toward the right (FIG. 3), up the sloping ramp 66, and between the first pair of rollers 68 and 70. The document is then fed downwardly by the belts 72 around the roller 24 into contact with the endless belt 20. This belt moves the document 26 into contact with and along the exposure platen 14 of the copy machine 12 until the leading edge of the document strikes the right-hand edge of the stop member 54 of the gate assembly 48 which is then in a stop position (FIG. 4). When the document 26 reaches the copy position with the end in engagement with the stop member 54, it is ready for copying. The copy machine 12 is activated to make the desired number of copies.

After the copies have been reproduced, the gate assembly 48 is opened (FIG. 5) by operation of the gate solenoid 60; and the belt 20 is again energized through the motor drive 84 to rotate the feed roller 24 in a clockwise direction. With the gate open, the document 26 is moved to the left (FIG. 5), and discharged as indicated by the arrow A. At the same time, the next document in the stack of documents on the tray 36 is moved into position by the feeder assembly 64. The cycle is continued until the supply of original documents is exhausted.

Control Circuit

Figure 9:
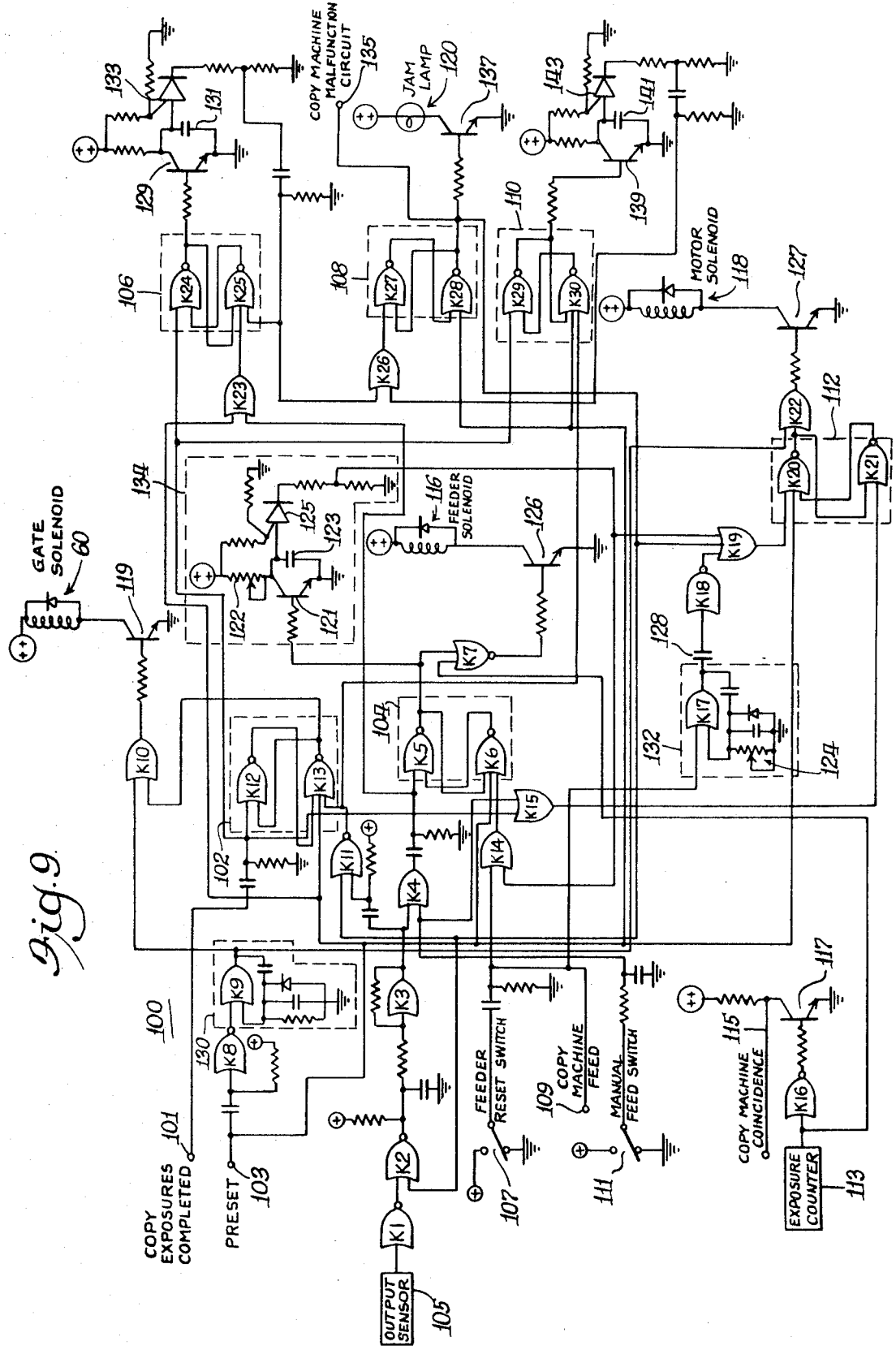
FIG. 9 illustrates in schematic diagram form a preferred embodiment of a circuit for controlling the operation of document feeder.

A preferred embodiment of a circuit 100 for controlling the operation of the document feeder 10 is illustrated in FIG. 9. The control circuit 100 operates in conjunction and in synchronization with the control circuit in the copy machine 12 shown (FIG. 5) and described in the above-identified copending application Ser. No. 889,594. In the ensuing description, reference is made to the circuit for the machine 12, and reference numbers referring to this circuit are identified below by a suffix character "X." For example; a start button 80 for the copy machine 12 is identified herein as "80X."

1. Power On and Preset

To begin operation, the on-off button 80X of the copy machine disclosed in the aforementioned copending U.S. Pat. application Ser. No. 889,594 is depressed to place that machine in operation. The document feeder is also activated by the on-off button of the copy machine and derives its logic and relay voltage from the bias power pack 228X of the copy machine. In the following description of the operation of the control circuit of the document feeder, reference should generally be made to FIG. 9 of the instant drawings and to FIG. 5 of the drawings of the aforementioned copending application Ser. No. 889,594.

After the copy machine is originally turned on, the preset timer 245X of the copy machine provides a positive pulse to set the control registers of the control circuit of the copy machine to an initial state. This preset pulse is also applied to a terminal 103 of the feeder control circuit 100. The preset pulse is effective to set the control registers of the control circuit 100 to an initial off state. The present pulse sets a first jam check register 106 which includes a pair of cross-coupled NOR gates K24 and K25, in an off state. The control register 106 is placed in an off state in the following manner. The positive preset pulse is applied to the input of an OR gate K23. This renders the output of gate K23 positive, which output is applied to the input of the NOR gate K25. This results in a negative output from the gate K25 and a positive output from the gate K24. The output from the gate K24 places a transistor 129 in a conductive condition to hold a capacitor 131 in a relatively discharged state, thereby maintaining an SCR 133 in a nonconductive state.

In a like manner, the positive preset pulse sets the second jam check register 110, including a pair of cross-coupled NOR gates K29 and K30; a jam detector register 108, including a pair of cross-coupled NOR gates K27 and K28; a gate control register 102, including a pair of cross-coupled NOR gates K12 and K13; a feeder control register 104, including a pair of cross-coupled NOR gates K5 and K6; and a motor control register 112, including a pair of cross-coupled NOR gates K20 and K21, in an off state. The operation of these control registers is basically the same as the operation of the first jam check register 106 described above.

The trailing edge of the positive preset pulse is further detected by a NOR gate K8 resulting in a positive output therefrom to the input of a preset one-shot 130. The preset one-shot 130 includes an OR gate K9 having its output coupled across a series capacitor to one of its input leads and a parallel RC circuit connected between that input lead and ground potential. When a positive voltage, greater than the threshold voltage of the gate K9 appears at the output of the gate K9, it is instantaneously coupled across the series capacitor back to its input to rapidly increase the rise time of the leading edge of the output pulse from the gate K9.

A positive voltage is subsequently continuously applied to the input of the gate K9 from the parallel RC circuit until the voltage across the parallel capacitor, in discharging through the parallel resistor connected to ground potential, drops below the threshold level of the gate K9. At that time, the output of the OR gate drops from positive logic voltage to ground potential. When this occurs, a diode connected in parallel with the parallel RC circuit and having its anode connected to ground potential becomes forward biased and rapidly discharges the series capacitor connected between the output and the input of the gate K9. Since the pulse width of the positive output pulse from the gate K9 depends upon the time constant of the parallel RC circuit, the pulse width may be easily set in advance to the value required.

The preset one-shot 130 provides a positive pulse to the inputs of OR gates K10 and K22 to temporarily turn on transistors 119 and 127, respectively. These transistors in their on condition energize the gate solenoid 60 and the motor solenoid 118 to place the gate assembly 48 in an open position (FIG. 5) and turn on the main drive motor 84, both for a period of time determined by the pulse width of the positive pulse from the preset one-shot 130. At the end of the pulse from the preset one-shot 130, transistors 119 and 127 are turned off, thereby deenergizing both the gate solenoid 60 and the motor solenoid 118. The gate assembly 48 thus assumes a stop position (FIG. 4), and the drive motor 84 is turned off. This aforementioned temporary opening of the gate assembly 48 and energization of the drive motor 84 occur in order to eject any original document that may have been left on the exposure platen 14 of the copy machine 12 at the end of the last operation.

2. Document Feed Initiation

The document feeder is now in a condition to transport original documents. The operator may now load the original documents 26 (FIG. 1) into the receiving tray 36 of the document feeder. After loading the original documents, the operator programs the number of copies of the original documents desired into the control head 33. This in turn sets an exposure counter 113 (FIG. 9) to the number of copies desired. The counter 113 counts the number of copies of each original document that has been made and is advanced in response to the pulses from an AND gate G21X of the copy machine 12.

The counter 113 provides a positive signal to NOR gate K16 (FIG. 9) when it is set at or registers zero. This results in a negative output from gate K16, turning off transistor 117 and placing a high voltage on a lead line 115 vhich is connected to terminal 412X of the copy machine. When the counter 113 is set at or registers a number greater than zero, it provides a ground signal to the input of gate K16. This results in a positive voltage output therefrom turning on transistor 117 and placing terminal 412X of the copy machine 12 essentially at ground potential. Thus, transistor 117 operates as a multiple copy request switch controlling the outputs of the multiple copy enabling gates G1X and G2X of the copy machine.

The output voltage of the exposure counter 113 further affects the operation of the feeder assembly 64 (FIG. 1). When the output voltage is positive, as occurs when the counter 113 (FIG. 9) registers zero, one input to NOR gate K7 thus also is positive. Transistor 126 and the feeder assembly 64 controlled thereby are held in an off condition to prevent any feeding of original documents 26 into the document feeder 10. When the output voltage of the exposure counter 113 is at ground potential, as occurs when the counter 113 registers any number greater than zero, the inhibit, that is, the positive voltage, is removed from the input to NOR gate K7. Thus, transistor 126 and the feeder assembly 64 are capable of being placed in an on condition when the voltage on the other input of NOR gate K7 is also at ground potential.

To begin the copy process, the manual feed switch 111 (FIG. 9) is depressed which sets the feeder control register 104 and the motor control register 112 to on states to turn on transistors 126 and 127, respectively, which in turn energize a feeder solenoid 116 and the motor solenoid 118. The energization of the feeder solenoid 116 operates the feeder assembly 64 to begin the feeding of an original document 26 from the stack of original documents in the receiving tray 36 of the document feeder 10 into the document transport path as illustrated by arrow B (FIG. 3). The energization of the motor solenoid 118 controls the energization of the drive motor 84 to rotate the rollers 24, 68, and 70.

When the leading edge of an original document deflects the feeder reset switch 107, a positive pulse is provided through a gate K14 to an input of the gate K6 to change the state of the feeder register 104, thereby turning off the transistor 126 through the gate K7. This results in the deenergization of the feeder solenoid 116, causing the feeder assembly 64 to stop any further feeding of the original documents 26 along the document transport path.

Additionally, the feeder reset switch 107 provides a positive pulse to a motor one-shot 132, which in turn provides a positive pulse of a predetermined variable pulse width to the capacitor 128. The construction and operation of the motor one-shot 132 is essentially the same as that of the preset one-shot 130 discussed above, except for the use of a variable resistor 124 in the parallel RC circuit. The pulse width of the positive pulse from the motor one-shot 132 may be varied by adjusting a wiper arm of the variable resistor 124.

A NOR gate K18 responds to the trailing edge of the positive pulse from the motor one-shot 132 to provide a positive output through a gate K19 to reset the motor register 112 to an off condition, thereby turning off the transistor 127. This results in the deenergization of the motor solenoid 118 to thereby deenergize the motor 84. It should be noted, however, that the motor 84 remains on after the feeder reset switch 107 is deflected for a period of time determined by the pulse width of the positive pulse from the motor one-shot 132. The time that the motor 84 is held on after the tripping of the feeder reset switch 107 is adjusted to permit the leading edge of the original document 26 to be transported along the document transport path to a position abutting the blocking edge of the gate assembly 48 (FIG. 4). The position of the leading edge of the original document 26 in relation to the gate assembly 48 may be altered by suitably adjusting the wiper arm of the variable resistor 124 of the motor one-shot 132. In addition, to insure against buckling, the endless belt 20, as discussed above, is designed to slip or slide over the back surface of the original document 26 when it is in contact with the gate assembly 48.

3. Copy Machine Initiation

In response to the tripping of the feeder reset switch 107, a positive pulse is provided to the copy machine 12 from a terminal 109 of the document feeder 10 to the input of a gate G6X of the copy machine to begin the feeding of the copy material into the copy material transport path of the copy machine 12. The copy machine 12 then proceeds to make the number of copies of the original document 26 previously programmed into the exposure counter 113.

4. Document Feed Reinitiation

When the exposure counter 113 counts down to zero during the copying process, advantageously in response to a signal from the output of AND gate G21X of the copy machine 12 generated at the occurrence of a copy material cutting operation, a positive voltage is applied to the inputs of NOR gates K7 and K16 from the exposure counter 113 to prevent the activation of the feeder assembly 64 and to remove the copy machine 12 from the multiple copy mode. As soon as the last copy being processed of an original document 26 is detected by the exposure sensor 192X of the copy machine, a signal is generated by the exposure sensor 192X. The trailing edge of this signal may be used to reset the exposure counter 113 to the number of copies selected by the machine operator at the start of the copying operation, to remove the inhibit preventing activation of the feeder assembly 64, and to return the copy machine 12 to the multiple copy mode.

The exposure counter 113 may be reset to zero when a feeder timer 134 completes its time-out period or when power to the document feeder 10 and to the copy machine 12 is terminated. Alternatively, the exposure counter 113 may be left set at the number of copies selected for the last copy operation and changed, if desired, at the time of the next copy operation.

When the exposure counter 113 reaches zero and removes the copy machine 12 from the multiple copy mode, the xenon and corona control register 300X of the copy machine 12 is thereby enabled to change states in response to the leading edge of the next signal from the exposure sensor 192X of the copy machine 12. The next signal from the exposure sensor 192X occurs when the last copy of the preselected number of copies is detected.

Terminal 101 of the document feeder is connected to the output of gate XC2X of the xenon and corona control register 300X. When the xenon and the corona control register 300X changes state after the exposure of the last copy of an original document 26, the output from the gate XC2X switches from ground potential to a positive voltage. This positive voltage changes the state of the gate register 102 to energize the gate solenoid 60, thereby moving the gate assembly 48 to an open position (FIG. 5). Simultaneously, the motor register 112 changes state to thereby energize the motor solenoid 118 and thereby turn on the motor 84.

Simultaneously, the first jam check register 106 and the second jam check register 110 change state to turn off the transistors 129 and 139, respectively. This initiates the time-out period of each of the jam check circuits.

Turning on the motor 84 results in rotating the roller 24 and the endless belt 20. With the gate assembly 48 in an open position (FIG. 5) and the endless belt 20 rotating in a clockwise direction, the original document 26 is normally expelled from the exposure platen 14.

At the exit of the document feeder 10 is an output sensor 105 (FIG. 3). In a preferred embodiment, sensor 105 comprises a photoelectric cell that provides a positive output signal when its light beam is interrupted by an original document 26 that is being expelled from the document feeder 10 and a ground output signal when its light beam is uninterrupted. Alternatively, a miniature mechanical switch may be used in the place of the photoelectric cell. When the leading edge of an original document being expelled from the document feeder is detected by the sensor 105, a positive pulse is provided through OR gates K3 and K4 to the input of NOR gate K5 to change the state of the feeder register 104, thereby turning on the transistor 126. When the transistor 126 turns on, the feeder solenoid 116 is energized to reinitiate the operation of the feeder assembly 64. This results in the second original document 26 from the stack of original documents being fed into and along the document transport path of the document feeder 10.

Simultaneously, with the changing of the state of the feeder register 104, the sensor 105 provides a positive pulse through an OR gate K23 to change the state of the first jam check register 106, to thereby turn on the transistor 129. Assuming that this occurs before the time-out period of the first jam check circuit has run, the time-out period is thereby interrupted and the capacitor 131 is discharged through the transistor 129, thereby maintaining the SCR 133 in a nonconductive state.

When the trailing edge of the original document 26 passes the sensor 105, the pulse from the sensor 105 falls from a positive voltage to gound potential. This change in voltage levels results in a negative pulse at the input of the NOR gate K11. The positive output from the gate K11 resulting therefrom is used to reset the gate register 102 and the second jam check register 110 to deenergize the gate solenoid 60 and to interrupt the time-out period of the timing circuit of the second jam check circuit, respectively. Deenergizing the gate solenoid 60 causes the gate assembly 48 to move to its stop position (FIG. 4).

5. Jam Check Operation

During the time-out periods of the first and second jam check circuits, capacitors 131 and 141 are being charged until the voltage developed across these capacitors is sufficient to render the SCR's 133 and 143 conductive. The first jam check circuit monitors the transfer of the leading edge of the original document 26, and the second jam check circuit monitors the transfer of the trailing edge of the original document 26. Thus, the time-out periods of these jam check circuits are different in that the time-out period of the first jam check circuit is shorter than the time-out period of the second jam check circuit. The time-out periods are determined by the RC time constants of the respective jam check circuits.

If either the leading edge of the original document 26 jams and fails to pass the sensor 105 before the time-out period of the first jam check circuit has run or the trailing edge of the original document 26 fails to pass the sensor 105 before the time-out period of the second jam check circuit has run, a positive signal will be applied from either one or both of the jam check circuits to the input of gate K26. This in turn results in a positive signal being applied to the input of the gate K27, thereby changing the state of the jam detector register 108. This change of state results in the output of the gate K28 going positive, thereby turning on transistor 137 and lighting a jam lamp 120 which is physically located on the control head 33 (FIG. 1).

A positive signal is also provided from the jam detecting circuit through the gate K19 to the input of the gate K20 to change the state of the motor register 112. This results in the turning off of the transistor 127 and the deenergization of the motor solenoid 118 to thereby turn off the motor 84. A positive signal is additionally provided to the inputs of NOR gates K2 and K11 to prevent a subsequent signal from the output sensor 105 from changing the states of the control registers of the document feeder control circuit. The expiration of the time-out period of a feeder timer 134 will subsequently deactivate the feeder assembly 64, assuming that it had been activated in response to the timely detection of the leading edge of an original document 26 by the sensor 105.

Simultaneously with the lighting of the jam lamp 120, a positive signal is applied to the copy machine malfunction circuit. Terminal 135 is connected to the input of a gate JD2X of a bistable jam detecting circuit 332X of the copy machine 12. Applying a positive input to the gate JD2X changes the state of the bistable jam detecting circuit 332X and thus shuts down the copy machine 12. A jam lamp 96X and service lamp 86X turn on; and a manual jam reset switch contact 98aX is closed by relay K3X of the copy machine 12.

Since a transistor 307X in a corona control circuit of the copy machine 12 is turned off under a jam condition, a remote trip timer 244X of the copy machine begins to time-out. Approximately 25 seconds later, the remote trip timer 244X energizes a relay K2X of the copy machine 12. This in turn disconnects a contact K2aX resulting in the deenergization of the copy machine 12.

After the jam in the document feeder 10 has been cleared, the document feeder 10 and the copy machine 12 will begin to operate again only after a manual jam reset switch 98X of the copy machine 12 is pressed to open the switch contact 98aX. Thus, a specific positive act is required of the operator before the document feeder 10 and the copy machine 12 can be rendered operative again.

6. Power Off

Assuming that the last original document 26 has been copied and is being expelled from the document feeder 10, means are provided to turn the document feeder 10 and the copy machine 12 off. The feeder timer 134, comprising a transistor 121, a variable resistor 122, a capacitor 123, and an SCR 125 accomplishes this object.

When the sensor 105 detects the leading edge of an original document 26 being expelled from the document feeder 10, it provides a positive pulse to turn on the feeder assembly 64 and to simultaneously turn off the transistor 121. The turning off of the transistor 121 initiates the time-out period of the feeder timer 134. The feeder timer 134 operates essentially the same as, but has a different time-out period than, the timing circuits for the first and second jam check circuits previously discussed.

The time-out period of the feeder timer 134 may be adjusted by varying the position of a wiper arm of the variable resistor 122. The time-out period of the feeder timer 134 may be interrupted when the next original document 26 from the stack in the receiving tray 36 of the document feeder 10 deflects the feeder reset switch 107 after being fed into and along the document transport path by the feeder assembly 64. If copies of the last original document 26 have just been completed, the feeder assembly 64 will not be able to feed another original document 26 into and along the document transport path. Thus, the feeder reset switch 107 will not be deflected and the time-out period of the feeder timer 134 will run out.

When this occurs, the SCR 125 is rendered conductive and provides a positive output pulse to reset both the motor register 112 and the feeder register 104. This results in turning off transistor 127 and 126, respectively, thereby deenergizing the motor solenoid 118 and the feeder solenoid 116 to deactivate the motor 84 and the feeder assembly 64.

The time-out period of the remote trip timer 244X of the copy machine 12 continues to run during the time-out period of the feeder timer 134 of the document feeder 10. After the copying of the last original document 26 and the expiration of the time-out period of the feeder timer 134, the document feeder 10 is deactivated. Thus, since no further copying demands are presented to the copy machine 12 from the document feeder 10, the remote trip timer 244X of the copy machine times-out. This results in activating relay K2X of the copy machine to open a contact K2aX of the copy machine 12, thereby deenergizing the copy machine 12 and the document feeder 10.

Thus, a new and improved automated document feeder has been provided for transferring original documents 26 one at a time in succession into a copying position on the exposure platen 14 of a copy machine 12. Obviously, many modifications and variations of the present invention are possible in light of the above teachings. It is therefore to be understood that, within the scope of the appended claims, the invention may be practiced otherwise and as specifically described.

What is claimed and desired to be secured by Letters Patent of the United States is:

1. A device for controlling the operation of an assembly associated with copy-making apparatus for transporting a document from an input station along a transport path past an exposure station to an exit station, said assembly including drive means for transporting said document from said input station along said transport path to said exit station, gating means positioned at said exposure station movable between an open position and a blocking position and feeding means positioned at said input station for feeding said document into said transport path, said device comprising
   means for initiating the operation of said assembly,
   first sensing means disposed along said transport path for detecting the presence of said document,
   second sensing means disposed at said exit station for detecting the presence of said document,
   means operable at the initiation of the operation of said assembly for moving said gating means to an open position and for energizing said drive means both only for a predetermined time period to remove a document from said exposure station,
   means for energizing the feeding means to feed a document into the transport path both in response to a signal from said initiating means and also in response to a signal from said second sensing means and for deenergizing the feeding means in response to a signal from said first sensing means,
   means for moving said gating means to said blocking position both after said predetermined time period and in response to said signal from said second sensing means to provide a means for registering said document at said exposure station in position for exposure by said copy-making apparatus,
   means for moving said gating means to said open position subsequent to the exposure of said document at said exposure station to enable said document to be transported to said exit station,
   means for energizing said drive means in response to a signal from said initiating means and also subsequent to the exposure of said document at said exposure station to transport said document along said transport path and
   means for deenergizing said drive means in response to a signal from said first sensing means to interrupt the transporting of said document at a position in abutment with said gating means at said exposure station.

2. The device defined in claim 1 further comprising timing means having a predetermined time-out period initiated both in response to a signal from said initiating means and in response to said signal from said second sensing means for deactivating said transporting assembly at the expiration of said time-out period, said time-out period being capable of being interrupted in response to a signal from said first sensing means to thereby prevent the deactivation of said transporting assembly.

3. The device defined in claim 1 further comprising plural jam check means, each having a predetermined time-out period and each being capable of deactivating said transporting assembly at the expiration of its respective time-out period,
   the time-out period of a first one of said plural jam check means being capable of being interrupted in response to a first portion of said signal from said second sensing means to thereby prevent the deactivation of said transporting assembly,
   the time-out period of a second one of said plural jam check means being capable of being interrupted in response to a second portion of said signal from said second sensing means to thereby prevent the deactivation of said transporting assembly.

* * * * *